United States Patent

Miyanaga

[11] Patent Number: 5,915,893
[45] Date of Patent: Jun. 29, 1999

[54] MULTISTAGE BIT AND STOPPER

[75] Inventor: Masaaki Miyanaga, Miki, Japan

[73] Assignee: Kabushiki Kaisha Miyanaga, Hyogo, Japan

[21] Appl. No.: 08/831,222

[22] Filed: Apr. 2, 1997

[30] Foreign Application Priority Data

Jun. 5, 1996 [JP] Japan .................................. 8-142637

[51] Int. Cl.⁶ .................................................. B23B 51/00
[52] U.S. Cl. ........................ 408/202; 408/225; 408/241 S
[58] Field of Search ............................. 408/14, 201, 202, 408/226, 227, 241 S, 223, 224, 225

[56] References Cited

U.S. PATENT DOCUMENTS

| 1,389,390 | 8/1921 | Sparling .................................. 408/202 |
| 2,276,532 | 5/1942 | Welty . |
| 2,576,664 | 11/1951 | Berlien ................................... 408/230 |
| 2,786,373 | 3/1957 | Patton . |
| 2,897,696 | 8/1959 | Tisserant . |
| 3,017,643 | 1/1962 | Lehde, Jr. .............................. 408/202 |
| 3,076,356 | 2/1963 | Simich . |
| 3,564,945 | 2/1971 | Bradley . |
| 3,645,640 | 2/1972 | Zukas . |
| 3,758,222 | 9/1973 | Oakes . |
| 3,838,937 | 10/1974 | Hawley .................................. 408/224 |
| 4,039,266 | 8/1977 | O'Connell .......................... 408/241 S |
| 4,297,059 | 10/1981 | Miyanaga ................................ 408/202 |
| 4,521,145 | 6/1985 | Bieler . |
| 4,582,458 | 4/1986 | Korb et al. . |

FOREIGN PATENT DOCUMENTS

| 725505 | 5/1932 | France . |
| 1080865 A | 12/1954 | France . |
| 2209668 | 9/1973 | Germany ............................... 408/202 |
| 3332968 A | 3/1984 | Germany . |
| 19526686 A | 3/1996 | Germany . |
| 54-15383 | 1/1979 | Japan . |
| 501331 | 8/1938 | United Kingdom .............. 408/241 S |
| 1368270 | 9/1974 | United Kingdom .................. 408/201 |
| WO 8301215 A | 4/1983 | WIPO . |

OTHER PUBLICATIONS

Werkstatttstechnik, vol. 64, No. 9, 1974, p. 588 XP002040363 "Eugen Dürr, Stuttgart".

Primary Examiner—Daniel W. Howell
Attorney, Agent, or Firm—Marshall, O'Toole, Gerstein, Murray & Borun

[57] ABSTRACT

A multistage bit is provided with a base part having a profile of stepped conical body with its tip cut off, and with a tip drill having a blade B of the smaller diameter than the blade B which is formed on the stage 2 at the foremost end of the base part A, the latter being provided freely detachably at the tip of the base part A.

The stopper S for the above multistage bit comprises a ring shaped member having elasticity in the radial direction with its free diameter slightly smaller than the diameter of each stage of the multistage bit, a part of said ring shaped member being cut, and at least one cut end 18 thereof is bent to the center side of the ring so as to be stopped in the vertical groove 19 formed on the outer periphery of the multistage bit, and the height of the ring H is constituted to be equal to or slightly higher than the height of the stage 2.

14 Claims, 7 Drawing Sheets

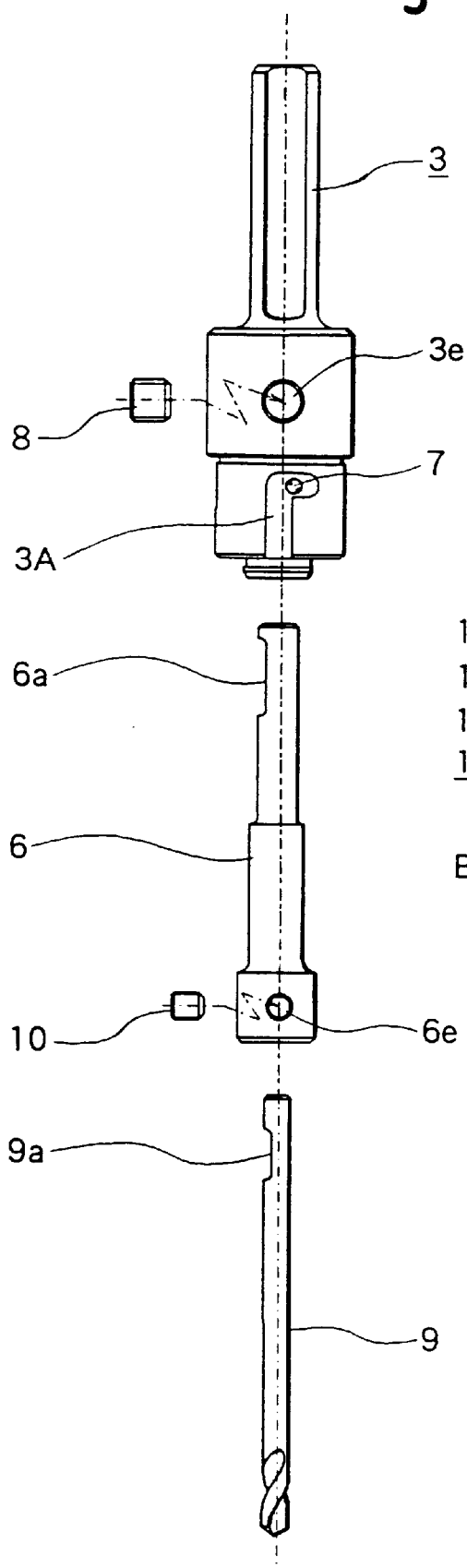
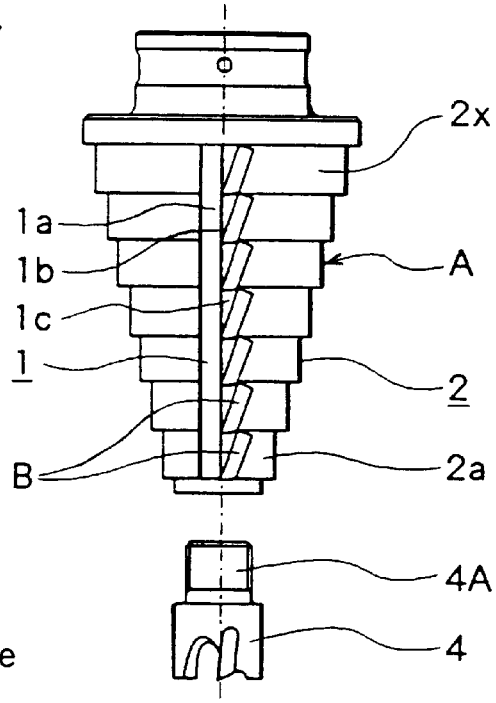
Fig. 1A
Fig. 1B

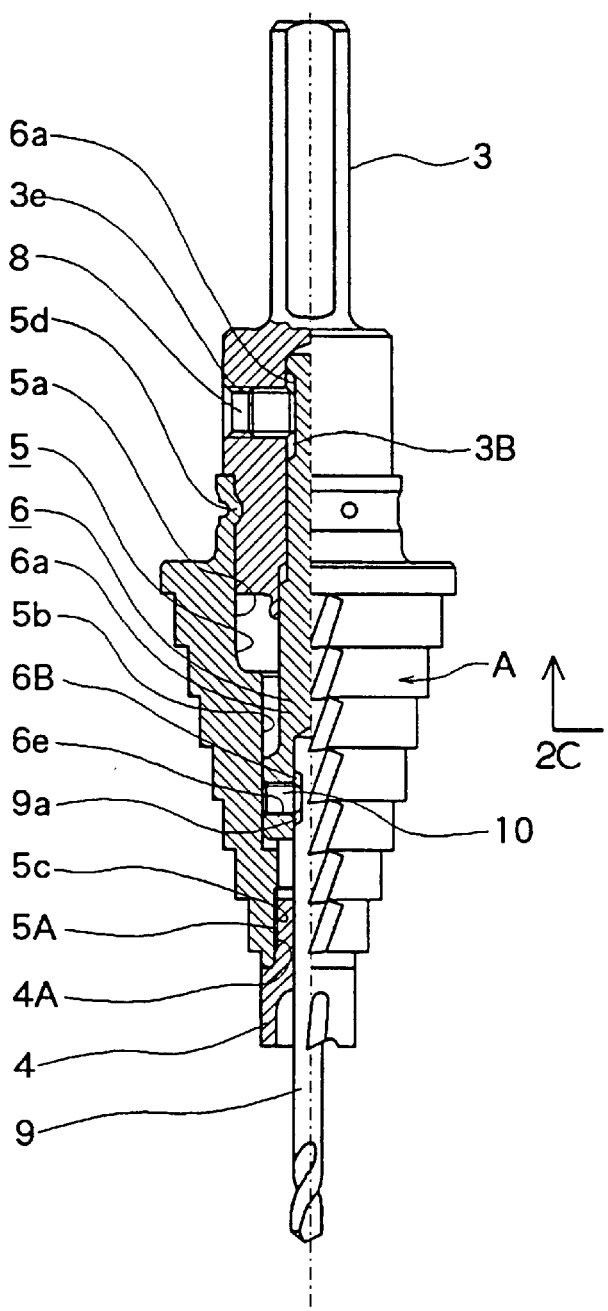
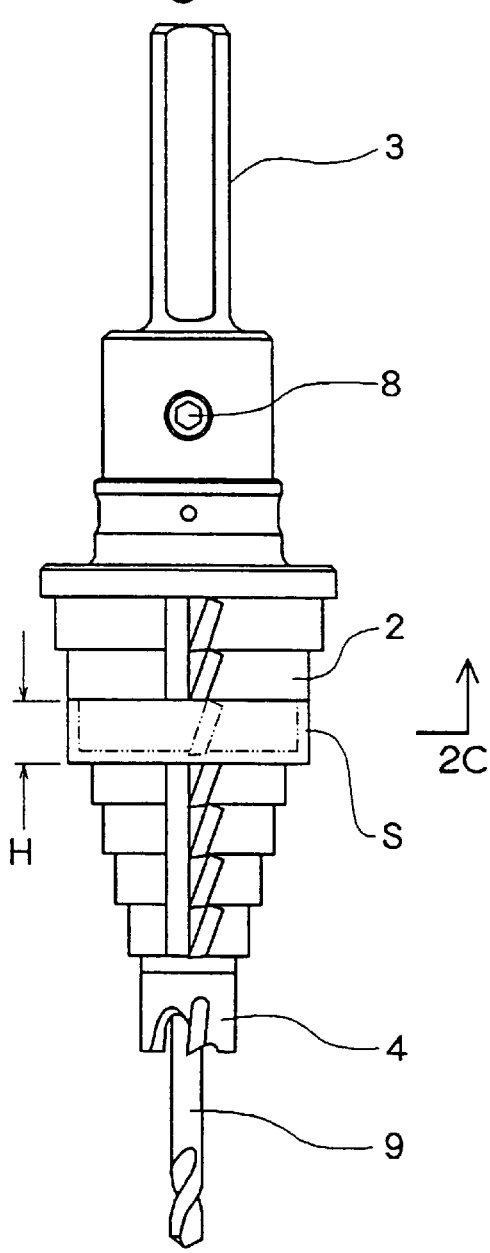
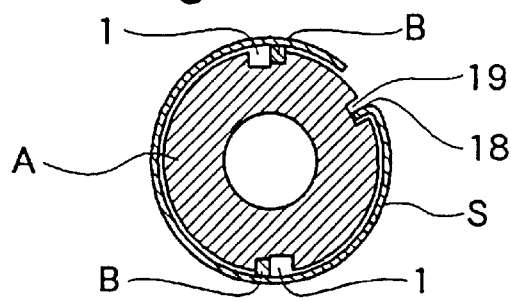

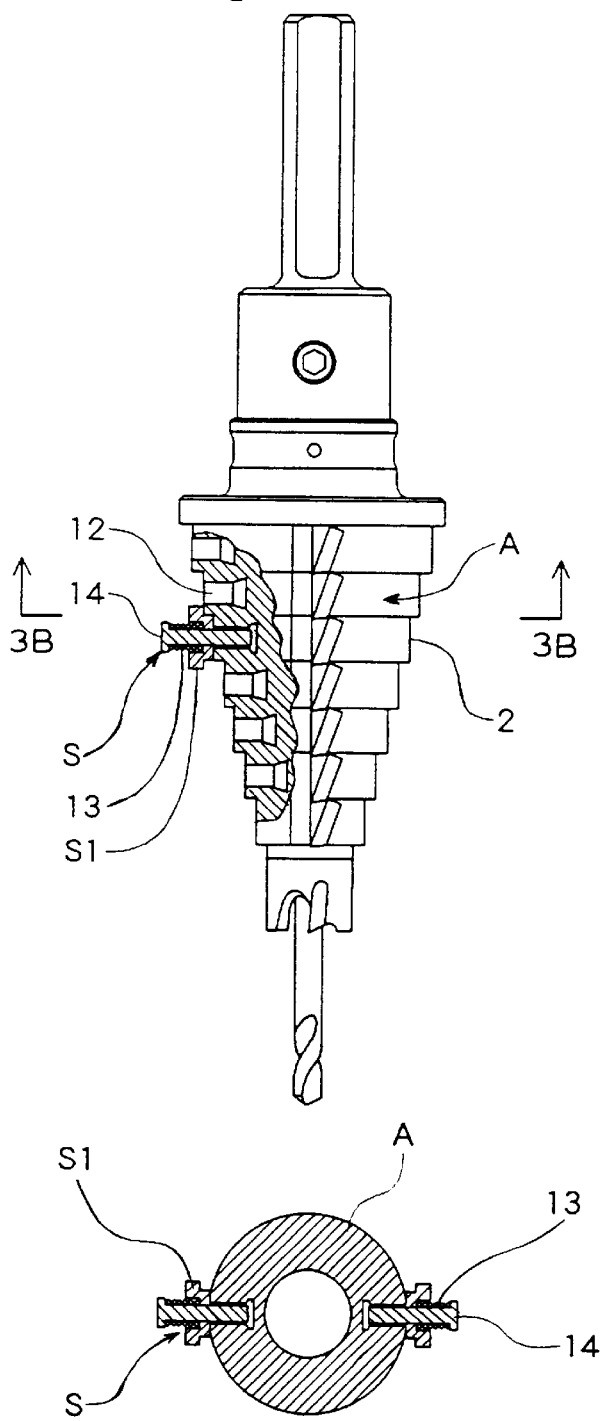
Fig. 3A
Fig. 3B
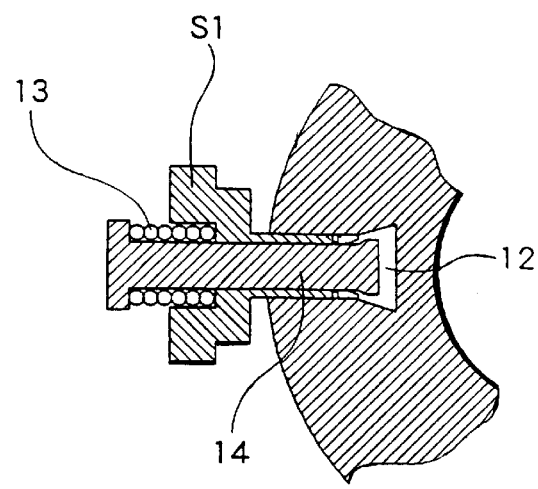
Fig. 3C
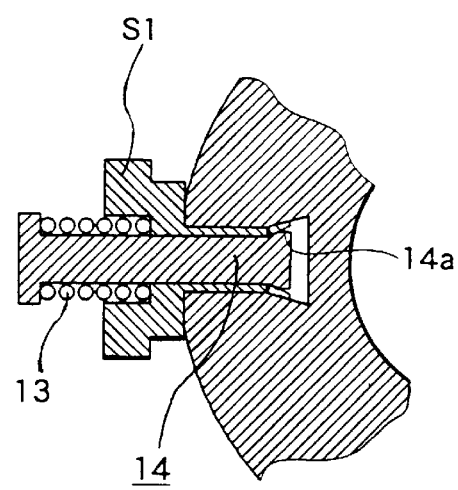
Fig. 3D

Fig. 4A
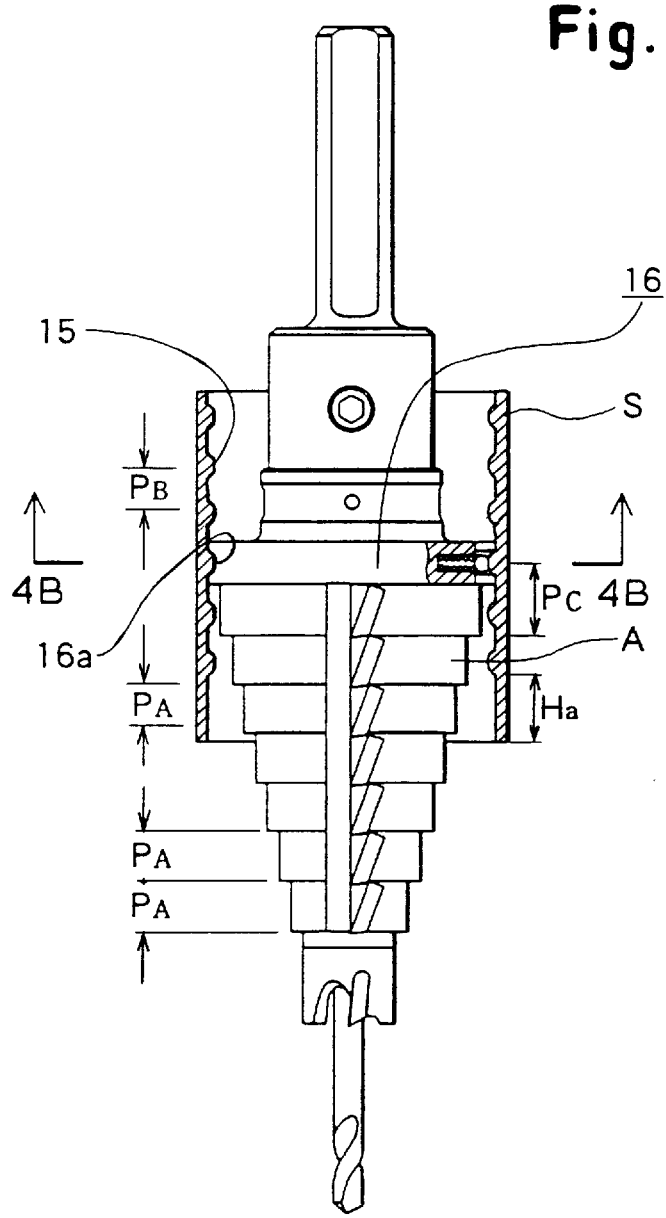
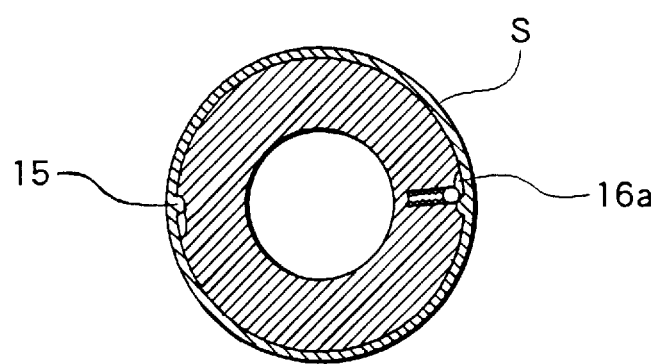
Fig. 4B

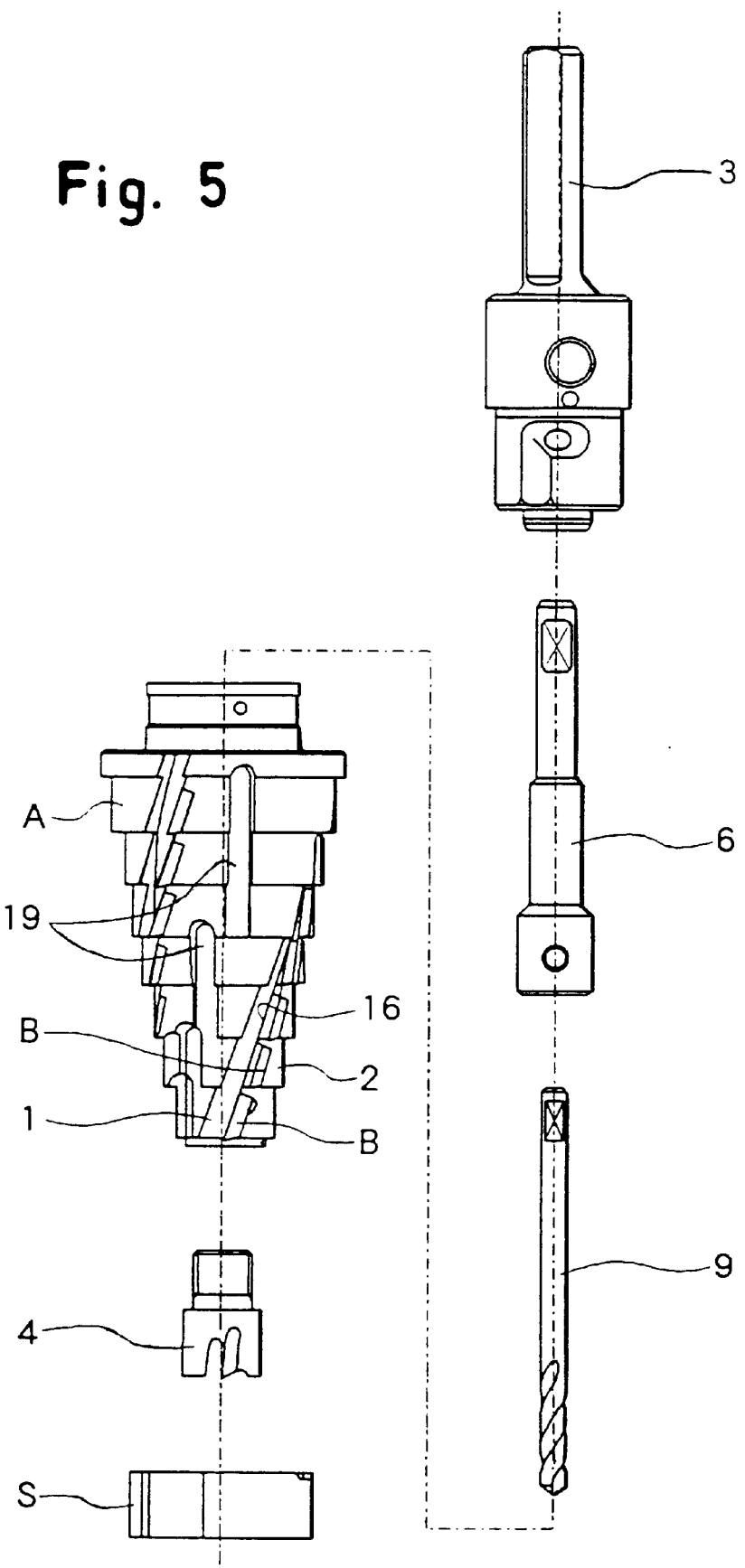

MULTISTAGE BIT AND STOPPER

BACKGROUND OF THE INVENTION

This invention relates to a multistage bit with several drilling stages for drilling a hole of a selected diameter, and a stopper with which drilling at a selected drilling stage can be made when said multistage bit is used.

In a prior art device, as shown in FIG. 7, there has been provided a multistage bit with several drilling stages and having a base part A whose whole profile is a stepped conical body with its tip cut off, including a longitudinal groove 1 extending from the large diameter part to the small diameter part of the stepped conical body, and a blade B directed forward of the rotating direction and downward and projecting outward in the radial direction and from the lower end of each drilling stage. The blade B of each stage is formed on the periphery 2 on the rear side in the rotating direction of the groove 1a on which the longitudinal groove 1 of each stage is formed. This prior art multistage bit has been utilized for drilling a steel plate or the like having a plate thickness less than one stage, and wherein the drilling of the hole size corresponding to one of the stages can be performed by using a respective one of several drilling stages ranging from the stage 2a of smallest diameter to the stage 2x of largest diameter, with this single bit.

In particular, in the case of this prior art multistage bit, the shank part 3 to be set on the drilling machine side (drilling machine, portable electromotive drill, etc.), the above base part A, and the tip drill 4 of the smallest diameter at the tip have been integrally formed in one piece.

And, in case of the actual drilling, for example, in case of carrying out drilling using the fourth stage from the tip, the procedures are such that the shank part 3 is set to the drilling machine, and drilling is sequentially, first with the tip drill, then with the second stage, and next with the third stage, and thereafter with the desired fourth stage.

For this reason, the tip drill and the blade part of the stage on the tip side have a higher frequency of use, and accordingly, the tip drill and the blade part of the stage on the tip side are subject to much more abrasion and damage than the other parts.

As a result, because of the fact that, contrary to the slight abrasion of the blade part of the stage near the shank part, the blade part of the stage on the tip side shows significantly more abrasion or damage, the situation makes it necessary to scrap the whole multistage bit.

Especially where the tip drill has been damaged immediately after the commencement of the drilling work using the new multistage bit, there may occur such inconvenience that the multistage bit must be scrapped without having used any blade on the rest of the stages. Also, due to the frequent occurrences of breakage on the tip drill side having smaller diameter, this defect has provided a significant problem in production efficiency.

The present invention has been made in view of the prior art problems as above indicated, and therefore it is an object to provide a multistage bit which is partially replaceable, and a stopper which is best suited to such a multistage bit.

SUMMARY OF THE INVENTION

In order to solve the problems as described above, the multistage bit with several drilling stages according to the present invention includes a base part whose whole profile is a stepped conical body with its tip cut off, including a vertical groove (i.e., a longitudinal extending groove) from the large diameter part to the small diameter part of the stepped conical body, and a blade part directed forward of the rotating direction and downward and projecting outward in the radial direction and from the lower end of each stage. The blade of each stage is formed on the periphery on the rear side in the rotating direction of the groove on which the vertical groove of each stage is formed, thereby making it possible to provide a hole with a diameter corresponding to a stage by drilling with a blade on a selected one of several stages.

The multistage bit includes a tip drill which is disposed so that the blade of a diameter the same as or smaller than that of the blade formed on the foremost, adjacent stage of the base part is detachably disposed to the base part.

Therefore, in the multistage bit constructed in accordance with the invention, when the tip drill which has the highest frequency of use and the largest possibility of damage in use is broken, only the tip drill needs to be replaced by a new part, so that it is not necessary to scrap the entire multistage bit including the expensive base part.

In the preferred embodiment of the multistage bit of this invention, when the longitudinal extending groove is provided by a groove coiling upward in reverse direction to the rotating direction on the stepped conical body (referring to the spiral form which advances to the shank side by rotating from the tip side in reverse direction to the rotating direction), it becomes possible to discharge the chip cut with the blade part smoothly upward.

Also, when the above blade part is constructed to have a rake angle of the same angle as the spiral inclination of the longitudinal groove and the front face of the blade part nearly agrees with the periphery of the rear side in the direction of rotation of the longitudinal groove, it becomes possible to discharge the chip more smoothly without interference by the blade part positioned upward.

Further, as another embodiment of the multistage bit, it is desirable for each blade part of the above base part to be formed by emplacing a carbide chip in the rear side periphery of the longitudinal groove, in which case the base part excluding the blade part can be manufactured by an ordinary low-priced steel material, and only the blade part may be provided by welding such as by braising in the carbide chip. A carbide chip blade has excellent cutting performance and durability, so that production can be made at low cost and productivity can be increased. In addition, the multistage bit can maintain good cutting performance over a long period of time, and has excellent durability.

Furthermore, as another embodiment of the multistage bit, the shank portion for fitting the base to the drilling machine is detachably connected to the base, so that the base which sustains abrasion can be replaced, and a multistage bit which shows scarce wear can still be utilized.

Furthermore, as another embodiment, there is formed a construction wherein a through-hole is formed at the central part of the base. A center drill having a mounting base is fitted to the tip of the shank which projects from the tip of the through-hole, so that position setting of the multistage bit is facilitated in the drilling work, and it becomes possible to bore the initial through-hole in a short time. Accordingly, in providing the desired drilling, the whole drilling time can be shortened.

In a still further embodiment, a center drilling sleeve is provided between the above shank and the center drill, thereby enabling a commercially available drill to be used as a center drill. If the size of the center drill sleeve is provided in a larger diameter, it increases the strength of the center drill against the buckling force to further reduce the breakage of the center drill to a reasonable extent.

A stopper for a multistage bit according to the present invention is characterized by being constituted by a ring shaped member whose free diameter (diameter in a condition where no external force is exerted) is slightly smaller than the diameter of each stage of the multistage bit. A portion of the ring shaped member is cut, and at least one end of the cut portion is bent to the inner portion of the ring so as to be engaged in the longitudinally extending groove formed on the outer periphery of the multistage bit. The height of the ring shaped member is equal to or slightly greater than the height of the stage part.

The stopper for the multistage bit constructed as above may be selected as one matching the diameter of the stage which is desired to be fitted in drilling, and simply fitted to the desired stage from the tip side of the multistage bit in a state of expansion. In so doing, if the fitting is made so that the bent part of the stopper enters into the longitudinal groove, the stopper is to be engaged in the direction of rotation. If the stopper is fitted in a condition that its upper end is in contact with the lower face of the stage of the upper stage side, the upper end of the stopper is fixed to the upper stage side in the axial direction by the stage on the upper stage side. Also, by mounting the stopper as above, even during the rotation of the multistage bit to bore the cutting object, there is maintained a state of said multistage bit being stopped at the predetermined stage, so that, the drilling work is carried out until the lower end of the stopper comes into contact with the object to be cut, no further cutting can be resumed, and the hole of the desired diameter is thereby provided.

In one embodiment of a stopper constructed of a spring steel, the stopper has strong elasticity and is desirable as it is strongly fixed to and held by the multistage stopper side. Additionally, this embodiment is excellent as it is easy to construct and readily attached, except that a respective stopper is required for each stage.

Another stopper for a multistage bit according to the invention is constructed in a cylindrical form having an inner diameter which is approximately equal to the outer shape of the flange formed on the upper part of the uppermost stage of the multistage bit, with a plurality of stoppers being formed in a multistage configuration on the cylindrical inner peripheral surface so as to stop at the flange part at a pitch equal to the pitch of each stage of the multistage bit on the cylindrical inner peripheral surface. The stopping part at the lower end is constructed to be equal to or slightly greater than the height of each stage of the multistage bit.

Also, the cylindrical form stopper for a multistage bit constructed as above may be fitted in drilling so that the stage part of the multistage bit to be finally used is exposed from the lower end of the stopper. Accordingly, in the case of this stopper, there is no need to provide several sized stoppers to match the stage to be used. In the cylindrical form stopper embodiment, a single stopper can be used by shifting its position up or down to the flange part for cutting all stages of the multistage bit. Moreover, the cylindrical form stopper operates in the same stopping manner as other embodiments so that, the drilling work is carried out until the lower end of said stopper comes into contact with the object to be cut and no further cutting can be resumed, whereby the hole of the desired diameter can be provided.

In this cylindrical form stopper embodiment for the multistage bit according to the invention, a recess is formed on the outer periphery of the flange, and, in this recess, a stopping ball is mounted such that its peripheral surface projects from the recess and is freely movable to recede to inside the recess. The stopping part of the stopper is formed by a plurality of projections on the cylindrical form inner peripheral surface so as to retain the stopping part of the stopper to said recess, so that, in stopping the stopper to the flange, the stopped ball recedes, and under the stopped condition, the stopped ball holds the cylindrical stopper to the flange part.

Also, in another stopper of the present invention, a stopper for a multistage bit is characterized by being constructed by a stopping pin to be inserted in and fitted to a stopping hole extending in a radial direction on the lateral side of each stage of the multistage bit and a stop member mounted to the stage through the stopping pin.

The stop member may be mounted, through a stopping pin, to a stopping hole formed on the stage above the stage of the multistage bit to be used in drilling. Accordingly, in the case of this stopper, there is a feature that, without requiring to provide different stoppers to match the stage to be used, the stopping pin and the stop member are appropriately changed in the arrangement to match the desired cutting stage of the multistage bit. Moreover, in the same manner as in the prior stopper embodiments, the drilling work is carried out until the lower end of the stopper comes into contact with the object to be cut and no further cutting can be resumed, whereby the hole of a desired diameter is provided.

In this stopping pin embodiment a stop flange may be provided with the lower end of the stop flange extending equal to or slightly below the lower end of the desired cutting stage of the multistage bit.

Alternatively, as another embodiment, a stopping pin is provided with a spring for pressing and urging the stop member to the stage side of the multistage bit, so that the stop member is securely pressed to the multistage bit side.

BRIEF DESCRIPTION OF THE DRAWINGS

FIGS. 1(a) and (b) are exploded views showing the construction of a multistage bit according to the preferred embodiment of the present invention, wherein FIG. 1(a) is an exploded view showing a shank and a center drill sleeve and tip drill to be fitted to the tip part thereof, and FIG. 1(b) is an exploded view showing the base of the multistage bit and the tip drill at the tip thereof;

FIG. 2(a) is a side elevational view of the multistage bit shown in FIG. 1 with each member assembled and the left half portion being sectioned, FIG. 2(b) is a side elevational view illustrating a stopper fitted to the fifth stage of the multistage bit shown in FIG. 2(a), and FIG. 2(c) is a section taken along the arrow I—I in FIG. 2(b) showing the stopper fitting structure;

FIG. 3(a), 3(b), 3(c), and 3(d) are views showing an alternative stopper having a different construction from that of FIG. 2(b), wherein FIG. 3(a) is a side elevational view of the multistage bit partially sectional, showing the condition in which the stopper is fitted, FIG. 3(b) is a sectional view of the stage taken along the arrow II—II of FIG. 3(a) showing the construction of the stopper, FIG. 3(c) is a partially enlarged section of FIG. 3(b) showing the condition of the stopper being fitted to or removed from the bit side, and FIG. 3(d) is a partially enlarged section of (b) showing the condition where the stopper is set to the bit side;

FIGS. 4(a) and 4(b) are views showing an alternative stopper having a construction different from those of FIG. 2(b) and FIG. 3, wherein FIG. 4(a) is a side view with the stopper part sectioned, FIG. 4(b) is a section taken along the arrow III—III in FIG. 4(a);

FIG. 5 is an exploded view showing the construction of a multistage bit according to another embodiment of the present invention;

DETAILED DESCRIPTION OF PREFERRED EMBODIMENTS

Figure 6:
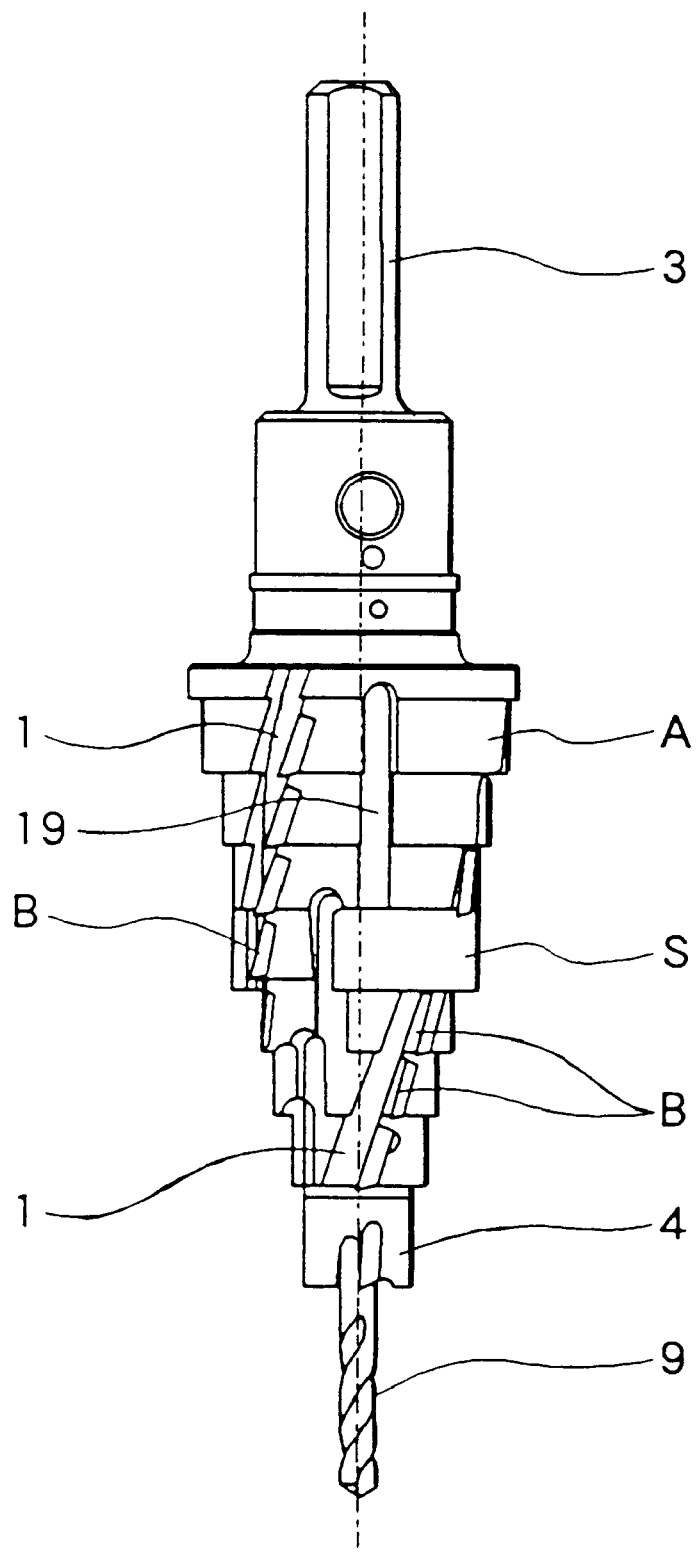
FIG. 6 is a side elevational view of the assembled multistage bit shown in FIG. 5 and a stopper fitted to the fourth stage.
Figure 7:
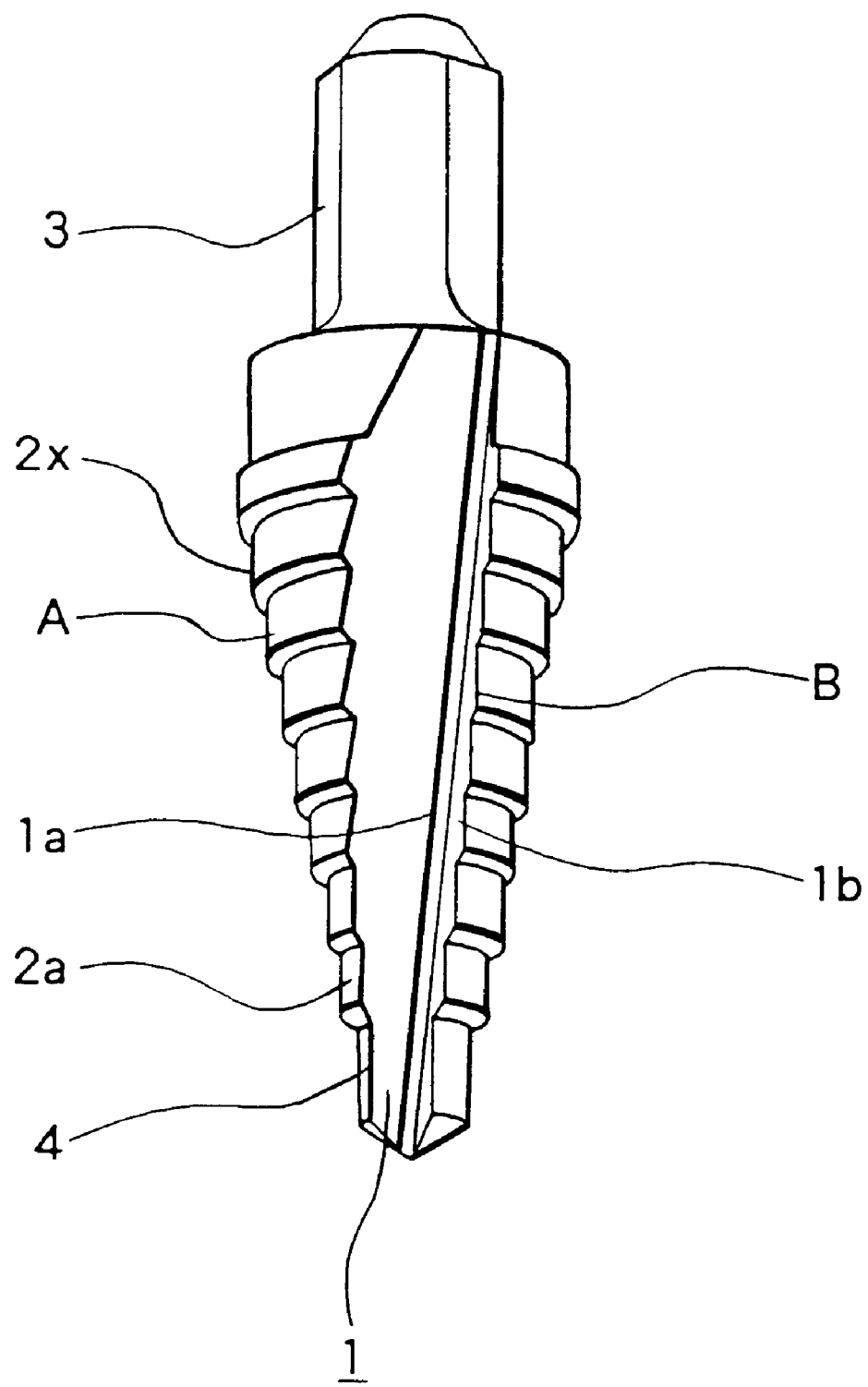
FIG. 7 is a perspective view showing the construction of the conventional, prior art multistage bit.

Hereinafter, the embodiments of a multistage bit according to the present invention will be conveniently described with reference to the drawings.

In FIGS. 1 and 2, a base part A has the whole profile of a conical body with its tip cut off. A longitudinally extending groove 1 is formed from the large diameter portion to the small diameter part of the conically shaped base part A along its vertical direction (axial direction). A plurality of drilling stages 2 formed in steps from the stage 2a of the smallest diameter to the stage 2x of the largest diameter extend around the periphery of the base part A. A blade B is formed on the base part A at each stage 2. The multistage bit includes a shank part 3, a tip drill 4, a center drill sleeve 6, and a center drill 9.

As illustrated in FIG. 1(b), on the base part A of this multistage bit the longitudinal (vertical) groove 1 is formed, and on the margin 1b on the rear side in the rotating direction of the groove 1a on which the vertical groove 1 of each stage 2a–2x is formed, a carbide chip (hereinafter to be simply referred to as chip) to form the above blade B is welded (in this embodiment, "brazed") in place. This chip faces forward in rotating direction and downward and projects from the periphery of the stage radially outward and from the lower end of the stage downward. Namely, the front face of the chip is aligned in the radial direction, and the upper end of the front face of the chip is inclined to the direction of rotation at about 25 degrees to the rear side in the direction of rotation to form a rake angle of the blade part B. The outside surface of the chip projects outward in the radial direction from the outer periphery of the base part A (stage 2), and the lower end of the chip projects downward from the lower surface of the stage 2 (2a–2x). Also, on the front side in the direction of rotation of the chip, there is formed a recess 1c which communicates with an upper groove portion 1a, being arranged so that nearly the whole front face of the chip projects outward in the radial direction from the groove portion 1a and the outer periphery of the bit, thereby making it possible to cut the object to be cut (steel plate or the like) with the front face and the lower end of the chip. Also, as illustrated in FIG. 2(a), at the axial central part of the upper base part A, a through-hole 5 is formed over the full length of base part A. The upper part 5a of the through-hole 5 has a larger diameter so as to accommodate the tip of the shank part 3 in a detachable manner. A lower central part 5b of the hole 5 is constructed so that a base end part 6a of the center drill sleeve 6 is detachably inserted in a bottomed hole 3B of the upper shank part 3. Also, in the tip part 5c of the upper through-hole 5, a female screw 5A is set, and the tip drill 4 of core drill shape includes a detachable male screw 4A at the base end.

In particular, as illustrated in FIG. 2(a), on the upper part 5a of the through-hole 5 in which the above shank part 3 is inserted, a projection 5d projecting inward is provided, and at the tip of the above shank part 3, as illustrated in FIG. 1(a), there are formed three inverted L-shaped stopping grooves 3A (in FIG. 1(a), only one of them is illustrated) through which the above projection 5d is passable, and at the bottom of the groove of the L-shaped bent part of one stopping groove 3A, a stopping ball 7 retained with urging means such as a spring for stopping the above projection 5d in a state of stopping to the L-shaped deep position is disposed until it becomes almost flat against the groove bottom side. In other words, by the step of the projection 5d on the base part A side passing over the stopping ball 7, the base part A is engaged in the shank part 3, and by its passing over in the opposite direction, the engagement is released and it becomes possible to move to the L-shaped opening side.

Also, as illustrated in FIG. 2(a), fixing of the center drill sleeve 6 to the bottomed hole 3B of the shank part 3 is attained by screwing the bolt (bolt with hexagonal hole) 8 into the fitting bolt hole 3e in the radial direction provided at a nearly central position of the vertical direction of the shank part 3 in the recess 6a of the center drill sleeve 6, and by pressing the bottom face of the bolt 8 and holding on the center drill sleeve 6. Accordingly, by loosening the bolt 8 with a tool (hexagonal wrench in case of a bolt with hexagonal hole), the center drill sleeve 6 can be detached in the axial direction.

Also, as illustrated in FIGS. 1 and 2, in the above center drill sleeve 6, a bottomed hole 6B opened to the tip side (ref. FIG. 2(a)) is provided in the center of the shaft, so that the center drill 9 is fixed to the bottomed hole 6B. The fixing of this center drill 9 is accomplished by screwing in a bolt (e.g., a bolt having hexagonal hole) 10 into a radial direction fitting bolt hole 6e provided at the tip part of the center drill sleeve 6, by pressing and holding the center drill 9 to the center drill sleeve 6 at the bottom surface of the bolt 10. Accordingly, by loosening the bolt 10 with a tool (hexagonal wrench in case of a bolt with hexagonal hole), detachment of the center drill 10 in the axial direction becomes feasible.

As illustrated in FIG. 2(b), on the above multistage bit, there is provided a stopper S according to one embodiment of the present invention for specifying the desired stage and preventing any further drilling. Namely, this stopper S comprises, as illustrated in FIG. 2 (b) and (c), a band member of partly cut ring having its free diameter slightly smaller than the diameter of the stage 2 desired to be fitted, and this band member is constructed of an elastic member such as a spring steel or a stainless steel having wide elastic deformation range. As illustrated in FIG. 2(c), one end 18 of the cut ring part is bent inward (toward the center) to engage in a vertical groove 19 of the multistage bit. Also, the height H (FIG. 2(b)) of this band member is constructed to be at least equal to the height of each stage 2, and accurately set to be slightly greater than the height of the stage. Also, in this embodiment, the groove 19 is provided independently from the longitudinal groove 1 to engage the end 18 of the stopper S, but the longitudinal groove 1 may be used if desired. Also, in use, the stopper S is fitted to the corresponding stage 2 of the multistage bit with the stopper S in a condition of being slightly expanded, so that the lower end of the stopper is approximately positioned at the lower end of the stage of the fitted stage (accurately, the stopper lower end is positioned to be slightly beyond the lower end of the fitted stage). Under the condition of being fitted as such, the stopper S is held by the lower face of the upper stage 2 in an axial direction of the multistage bit, and in respect to the rotating direction, the bent end 18 is engaged to the above longitudinal groove 19, and by the spring action of the stopper itself, it shrinks in a radial direction to be held and maintained to the outer periphery of the desired fitted stage 2 of the multistage bit.

Also, in the case of the stopper S according to this embodiment, the respective stoppers having different ring diameters are required to be made available to fit each stage.

In this case, as described above, it is desirable for the free diameter of each stopper S to be constructed as being slightly smaller than the diameter of the corresponding stage 2 so that the stopper can be set by spring action, in improving the property of fitting of the stopper to the multistage bit side.

For the multistage bit having spiral grooves illustrated in FIG. 5, the same shaped stopper can be fitted as illustrated in FIG. 6 in the same manner as in the multistage bit as illustrated in FIG. 1 and FIG. 2.

As to other embodiments of a stopper, as illustrated in FIG. 3(a) and (b), there are respectively provided, at the central position in the vertical direction of each stage 2 of the base part A, stopping holes 12 extending in the radial direction and having undercut portions at their bottoms for holding a stop member S1, respectively. A stopping pin 14 having an expanded part 14a disposed in expandable condition with a spring 13 on the side of the stop member S1 and the tip part of the stop member S1 are inserted in the stopping hole 12. In other words, as illustrated in FIG. 3(c), when, under the condition of the spring 13 being compressed, the stopping pin 14 is inserted (fitted) in the stopping hole 12, and then the spring 13 is released in a state of the member S1 being kept in contact with the base part A side, then, as illustrated in FIG. 3(d), the diameter-expanded part 14a of the stopping pin 14 expands the tip of the stop member S1 outward in the radial direction, and holds the tip of the stop member to the diameter expanded part at the tip in the undercut portion of the stopping hole 12. Also, in case of detaching the stop member S1 from the stopping hole 12, under the condition of the stopping pin 14 pushed to the base A side, i.e., under the condition of the spring 13 being compressed, pulling out force is applied to draw out the stop member S1 and the stopping pin 14 [ref. FIG. 3(c)]. In this case, the stop member S1 as shown in FIG. 3, is an integral one having a shape of being stepped in a direction of thickness, and it is desirable to make the stop member to come into rotatable contact with the object by providing separately a rotatable stop member on the outer periphery of the base end part of the stop member S1, so that contact with the object to be cut according to the rotation of the multistage bit results from contact by rotation (rolling contact).

In case of a stopper, because the stopper can be used in common for each stage, there is no necessity to provided several respective stoppers each having different ring diameters to meet the peripheral length of each stage as required in the stopper of the embodiment shown in FIG. 2.

Also, in the case of the stopper of FIG. 3, even in the case where the longitudinal groove 1 as illustrated in FIG. 5 is formed in a spiral shape, fitting of this type of stopper can be made irrespective of the longitudinal groove shape.

Further, as to another embodiment on the stopper, as illustrated in FIG. 4, a plurality of projections 15 are formed with a pitch PB equal to the pitch (height) PA of the stage 2 of the base part A of the multistage bit at two opposite places in the radial direction on the inner peripheral surface of the cylindrical stopper S, and there are formed at the two opposite places in the radial direction semicircular recess 16a in which a stopping ball 16b is buried at the center in a manner to recede freely in a direction of inner diameter so as to accommodate the projections 15. The several projections 15 of the stopper S are fitted in by receding the stopping ball 16b at the central part of the recess 16a, and as shown in FIG. 4(b), the stopper S is rotated in any of the peripheral directions with respect to the base part A, thereby making it possible to set the stopper S on any of the several stages 2. Of course, it is so constructed that the cylindrical stopper S has the inner diameter approximately equal to the outer diameter of the flange part 16 of the base part A on the multistage bit to be fitted to, and the height Ha from the lower end of the stopper S of the projection 15 formed at the lower end of the inner peripheral surface of the stopper S is equal to or slightly higher than the height Pc which is the height from the lower end of the uppermost stage to the recess 16a of the flange 16.

The cylindrical stopper of this embodiment is excellent in that there is no necessity to prepare a plurality of stoppers to fit the peripheral diameter of respective stages but only a cylindrical one may be provided.

In the case of this stopper, even where the longitudinal groove 1 as illustrated in FIG. 5 is spirally formed, the stopper can be easily fitted irrespective of the shape of the said groove.

Also, the multistage bit constructed as such can be applied to the drilling work with replacement of each part in the manner as described below.

When a drilling work is applied to a steel plate by using the stage 2 of the fourth step from the tip, setting is made to have the lower end of the stopper S positioned at lease equal to the lower end of the fifth (accurately, a position slightly lower than the lower end of the fifth step; ref. FIG. 2(b)) order from the tip. After that, drilling is performed with a center drill 9 for setting the center position, and then the hole of a small diameter is provided with a tip drill 4. Also, drilling of the holes with the diameters corresponding to the related stages from the first to the third stage are performed in sequence, and finally drilling the hole of the fourth stage having the objective diameter. In case of the drilling of this hole having the diameter corresponding to that of the fourth stage, the drilling work is finished when the lower end of the stopper S comes into contact with the upper surface of the steel plate, thereby making it possible to realize the drilling of the steel plate hole with the desired fourth stage diameter.

During the above drilling procedure, the chip produced at each stage is discharged upward along the longitudinal groove 1, thereby assuring the drilling work is accomplished smoothly.

Also, the center drill 9 and the tip drill 4 which are always used in the above described drilling work show the heaviest abrasion and damage. In the multistage bit according to this invention, the center drill 9 and the tip drill 4 can be simply replaced by loosening the bolt with a hexagonal wrench. Especially, as the center drill 9 which has high possibility of breakage is replaceable, even if this center drill 9 is broken, no such waste as requiring disposal of the whole multistage bit should occur.

Further, even in case of the abrasion of the base part A, if it is yet unnecessary to replace for example the center drill 9 and the tip drill 4 which have recently been replaced, then it is possible to replace only the base part A and resume using the shank part 3, center drill 9 and tip drill 4 as they are. Thus, by carrying out replacement to the minimum extent as necessary, it becomes possible to use the multistage bit in the best condition at all times. Further, the replacement of the base part A can be simply performed manually without using any tool, since the projection 5d on the base A side is simply stopped by the stopping ball 7.

Contrary to the conventional prior art case, according to the multistage bit of the present invention, there is no such inconvenience requiring replacement of the whole multistage bit because of the damage or abrasion of a part, notwithstanding the usable parts still remaining.

In the above embodiment, a core drill type tip drill and a center drill are fitted to the tip of the base part, but the construction may be such as to fit a drill of the same type as the center drill of large diameter equal to the outer diameter of the tip drill.

According to the construction of the multistage bit as illustrated in FIGS. 1 and 2 above, the chip cut with the blade B is usually discharged upward along the longitudinal groove 1, but when this groove is constructed by a spiral longitudinal groove 1 which slopes upward in the direction reverse to the direction of rotation of the multistage bit with an angle equal to the rake angle in front of the blade part B, the chip cut at the front face of the blade B of each stage 2 is smoothly discharged directly upward without being interrupted by the blade B which lies above, so that the cutting performance is further improved. The multistage bit illustrated in FIGS. 5 and 6 is basically furnished with the same construction as the multistage bit shown in FIGS. 1 and 2, except the construction of the longitudinal groove 1.

Namely, in FIGS. 5 and 6, 3 shows a shank part, 4 shows a tip drill, 6 shows a center drilling sleeve, and 9 shows a center drill. These are combined with the base A by means of the construction similar to that mentioned above (FIG. 2(a)). In the multistage bit according to this embodiment, a longitudinal groove 1 is spirally extended in an axial direction (vertical direction) on the outer periphery of the base part A of the frustoconical base part A, and the chip (carbide chip) constituting the blade part B is provided on the periphery 1b on the rear side in the direction of rotation of the vertical groove 1 so as to have the same rake angle as the spiral inclination (coil angle) of the groove 1. Accordingly, in the multistage bit illustrated in FIGS. 5 and 6, the recess 1c (recess 1c communicating with the groove 1a in FIG. 1(b)) provided forward of the direction of rotation of the blade B in the multistage bit shown in FIGS. 1 and 2 does not exist. In FIGS. 5 and 6, 19 shows a stopping groove in vertical direction for the purpose of holding the stopper S, and to this stopping groove 19 a stopper S having the same construction as that illustrated in FIG. 2 is maintained.

The multistage bit according to this embodiment also has excellent function and effect basically similar to those of the multistage bits mentioned above, except that the discharge of the chips cut with the blade B is more smooth.

Also, the stopper for the multistage bit constructed as described above can be operated for drilling work as described below in carrying out the drilling, and the parts can be replaced.

Hereinafter, the operation of the stopper for the multistage bit is explained along with the operation of the multistage bit.

Now, assuming one needs to carry out drilling of a steel plate with a stopper S of a style as illustrated in FIG. 2 by the use of the fourth stage from the tip, first, setting is made so that the lower end of the stopper S is positioned at the lower end of the fifth stage from the tip (accurately, a position slightly lower than the lower end of the fifth step; ref. FIG. 2(b)), after which drilling is performed with a center drill 9 for setting the center position, and then the hole of a small diameter is provided with a tip drill 4. And, the holes with the diameters corresponding to the related stages from the first to the third stage are provided, and finally the hole having the diameter corresponding to the size of the fourth stage which is the objective hole is provided. In case of the drilling of this hole having the diameter corresponding to that of the fourth stage, the drilling work may be stopped when the lower end of the stopper S comes into contact with the upper surface of the steel plate, thereby making it possible to realize the drilling with the desired fourth stage.

In case of using the stopper S of the form as illustrated in FIG. 3, by inserting (fitting) a stopping pin 14 in the stopping hole 12 formed at the fifth stage from the tip and fixing in the similar manner, providing a hole having the diameter corresponding to the fourth stage can be realized in the same manner as above.

Furthermore, in case of using the stopper S of a type as illustrated in FIG. 4, the projection 15 of the stopper S is set to the flange part 16 on the multistage bit side so that the lower end of the stopper comes to be equal to the lower end of the fifth stage, by which a hole having the diameter corresponding to the fourth stage can be realized in the same manner as above.

In the above embodiment, in the case of the stoppers of the styles as illustrated in FIGS. 3 and 4, there is no necessity to provide plural stoppers to fit the diameter of each stage of the multistage bit, namely, a single stopper can be utilized for the drilling work using any stage of the multistage bit.

In case of the stopper illustrated in FIG. 4, when it is formed in a vertically symmetric structure, even if the lower end of the stopper has worn out, the stopper can be used by inverting, and in such a case, it becomes possible to double the durable life of the stopper.

In the above drilling, the chip produced at each stage is discharged upward along the longitudinal groove 1, thereby assuring to maintain the drilling work smoothly.

And, according to the multistage bit of the present invention, only the center drill, tip drill, or base part which has caused abrasion or damage needs to be replaced, so that extremely economical utilization without waste is possible. Also, replacement of various parts can be readily accomplished.

Further, according to the stopper for the multistage bit of the present invention, the holes having the desired diameter can be simply provided in various multistage bits. Also, the stopper can be extremely simply fitted to and removed from the multistage bit, which can be performed simply and quickly by anybody.

What is claimed is:

1. A multistage bit having a base part with a profile in the form of a stepped conical body, each step of said conical body corresponding to a respective drilling stage, including a longitudinal groove from the large diameter part to the small diameter part of the stepped conical body, a respective blade part in each drilling stage directed forward of the rotating direction and downward and projecting outward in the radial direction and from the lower end of each stage, said respective blade being formed on the periphery on the rear side in the rotating direction of the longitudinal groove on which each stage is formed, thereby making it possible to drill a hole with a diameter corresponding to the desired drilling stage by drilling with a blade on a selected one of the stages, and wherein said multistage bit is characterized in including a tip drill stage having a blade of a diameter equal to or less than that of the blade formed on the foremost stage of the base part, and detachable mounting means for detachably mounting said tip drill stage to the base part;

a shank part detachably mounted to said base part; and a through-hole formed through the central part of said base part and a center drill having a base end inserted through said through-hole and detachably mounted to said shank part.

2. A multistage bit according to claim 1, wherein the longitudinal groove is in the form of a spiral groove sloping upward in reverse direction to the direction of rotation on the stepped conical body.

3. A multistage bit according to claim 2, wherein each said blade part includes a rake angle of the same angle as the spiral inclination of the longitudinal groove and the front face of the blade part substantially aligns with the periphery of the rear side in the direction of rotation of the longitudinal groove.

4. A multistage bit according to claim 1, wherein each blade part of the base part is formed by emplacing a carbide chip in the rear side periphery of the longitudinal groove.

5. A stopper member for a multistage bit having a base part with a profile in the form of a stepped conical body, each step of said conical body corresponding to a respective drilling stage, including a longitudinal groove from the large diameter part to the small diameter part of the stepped conical body, a respective blade part in each drilling stage directed forward of the rotating direction and downward and projecting outward in the radial direction and from the lower end of each stage, said respective blade being formed on the periphery on the rear side in the rotating direction of the longitudinal groove on which each stage is formed, thereby making it possible to drill a hole with a diameter corresponding to the desired drilling stage by drilling with a blade on a selected one of the stages, said stopping member comprising:

a stopping pin insertable in and mounted to a stopping hole extending in a radial direction on each drilling stage of the multistage bit, and a stop flange member having said stopping pin insertable therethrough and into said stopping hole for mounting said stopping pin at a desired drilling stage.

6. A stopper member for a multistage bit according to claim 5, wherein said stop flange member has a stop flange, and the lower end of said stop flange is positioned equal to or slightly lower than the lower end of one of the drilling stages of the multistage bit.

7. A multistage bit according to claim 1, including a center drilling sleeve detachably mounted between the shank part and the center drill.

8. A multistage bit according to claim 1, including a stopper for setting the desired drilling stage of said multistage bit.

9. A multistage bit according to claim 8, including means for enabling adjustment of said stopper on said base part, wherein said stopper is adjustable on said base part to select a desired drilling stage.

10. A stopper member for a selected drilling stage of a multistage bit having a base part with a profile in the form of a stepped conical body, each step of said conical body corresponding to a respective drilling stage, including a longitudinal groove from the large diameter part to the small diameter part of the stepped conical body, a respective blade part in each drilling stage directed forward of the rotating direction and downward and projecting outward in the radial direction and from the lower end of each stage, said respective blade being formed on the periphery on the rear side in the rotating direction of the longitudinal groove on which each stage is formed, thereby making it possible to drill a hole with a diameter corresponding to the desired drilling stage by drilling with a blade on a selected one of the stages, said stopper member for a selected drilling stage comprising:

a ring shaped member having a free diameter slightly less than the diameter of the selected drilling stage of said multistage bit, a part of said ring member being cut to form a ring end, and said ring end being bent towards the interior of the ring, a ring mounting groove formed on said multistage bit, said bent ring end engaged in the ring mounting groove, and the height of the ring member being equal to or slightly greater than the height of the selected drilling stage.

11. A stopper member according to claim 10, wherein the stopper member is formed of spring steel.

12. A stopper member for a multistage bit having a base part with a profile in the form of a stepped conical body, each step of said conical body corresponding to a respective drilling stage, including a longitudinal groove from the large diameter part to the small diameter part of the stepped conical body, a respective blade part in each drilling stage directed forward of the rotating direction and downward and projecting outward in the radial direction and from the lower end of each stage, said respective blade being formed on the periphery on the rear side in the rotating direction of the longitudinal groove on which each stage is formed, thereby making it possible to drill a hole with a diameter corresponding to the desired drilling stage by drilling with a blade on a selected one of the stages, said stopper member comprising:

a cylindrical form having an inner diameter which is approximately equal to the outer shape of the uppermost stage of the multistage bit, a stopping part being formed in multistage form with a pitch (PB) equal to the pitch (PA) of each drilling stage of the multistage bit, said stopping part formed on a cylindrical inner peripheral surface of said cylindrical form, and the stopping part having a lower end extension (Ha) equal to or slightly greater than the pitch (PA) of each drilling stage.

13. A stopper member for a multistage bit according to claim 12, wherein a recess is formed on the outer periphery of the uppermost stage of the multistage bit, and, a stopping ball mounted in said recess with a peripheral surface projecting from the recess and movable to recede to the inner portion of said recess, and the stopping part is formed with projections from said cylindrical form inner peripheral surface so as to engage the stopping part to said recess, so that, in stopping the stopper member to a drilling stage, the stopped ball recedes, and under the stopped condition, the stopped ball maintains the stopper member to the drilling stage.

14. A stopper member for a multistage bit according to claim 6, wherein said stopping pin is provided with a spring for pressing the stop flange member to the drilling stage of the multistage bit.

* * * * *